(12) United States Patent
Kanehagi et al.

(10) Patent No.: US 12,023,876 B2
(45) Date of Patent: Jul. 2, 2024

(54) METHOD FOR PRODUCING FIBER-REINFORCED RESIN MOLDING MATERIAL, AND APPARATUS FOR PRODUCING FIBER-REINFORCED RESIN MOLDING MATERIAL

(71) Applicant: Mitsubishi Chemical Corporation, Tokyo (JP)

(72) Inventors: Junji Kanehagi, Tokyo (JP); Yukihiro Mizutori, Tokyo (JP); Tadao Samejima, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 853 days.

(21) Appl. No.: 17/036,333

(22) Filed: Sep. 29, 2020

(65) Prior Publication Data

US 2021/0017670 A1    Jan. 21, 2021

Related U.S. Application Data

(63) Continuation of application No. PCT/JP2019/013976, filed on Mar. 29, 2019.

(30) Foreign Application Priority Data

Apr. 4, 2018    (JP) .................................. 2018-072556

(51) Int. Cl.
*B29C 70/00*     (2006.01)
*B29C 70/12*     (2006.01)
(Continued)

(52) U.S. Cl.
CPC .............. *B29C 70/14* (2013.01); *B29C 70/12* (2013.01); *D01D 11/02* (2013.01); *D02J 1/18* (2013.01);
(Continued)

(58) Field of Classification Search
CPC ....................................................... D01D 11/02
See application file for complete search history.

(56) References Cited

U.S. PATENT DOCUMENTS 4,702,872 A  *  10/1987  Yamamoto ............ B29C 41/365
                                                              264/114
5,476,617 A  *  12/1995  English .................... B27N 5/00
                                                              264/319

(Continued)

FOREIGN PATENT DOCUMENTS

CA        2971545 A1     6/2016
CN      107708951 A      2/2018
(Continued)

OTHER PUBLICATIONS

WO-2017006989-A1 (Tadao) Jan. 2017 (online machine translation), [Retrieved on May 1, 2023]. Retrieved from: Espacenet (Year: 2017).*

(Continued)

*Primary Examiner* — Seyed Masoud Malekzadeh
*Assistant Examiner* — Andres E. Behrens, Jr.
(74) *Attorney, Agent, or Firm* — Element IP, PLC

(57) ABSTRACT

What is provided is a method for stably producing a fiber-reinforced resin molding material by splitting a fiber bundle such that a split portion becomes long while anon-split portion is shortened. A method for producing a fiber-reinforced resin molding material in which a cut fiber bundle is impregnated with a resin, the method comprising a splitting step of splitting the fiber bundle with a splitting machine at intervals in a longitudinal direction and a cutting step of cutting the fiber bundle at intervals in the longitudinal direction after the splitting step, in which the splitting machine comprises a rotary blade having a releasing section and a spacer member adjacent to the rotary blade.

18 Claims, 5 Drawing Sheets

(51) Int. Cl.
    *B29C 70/14*     (2006.01)
    *D01D 11/00*     (2006.01)
    *D01D 11/02*     (2006.01)
    *D02J 1/00*      (2006.01)
    *D02J 1/18*      (2006.01)
    *B29K 101/10*    (2006.01)
    *B29K 105/12*    (2006.01)
    *B29K 307/04*    (2006.01)

(52) U.S. Cl.
    CPC ...... *B29K 2101/10* (2013.01); *B29K 2105/12* (2013.01); *B29K 2307/04* (2013.01)

(56) References Cited

U.S. PATENT DOCUMENTS

| | | | |
|---|---|---|---|
| 5,626,954 A * | 5/1997 | Andersen | B32B 37/144 |
| | | | 428/152 |
| 11,746,200 B2 * | 9/2023 | Ono | C08K 7/06 |
| | | | 428/297.4 |
| 2013/0244018 A1 | 9/2013 | Wohlmann et al. | |
| 2013/0317161 A1 | 11/2013 | Konagai et al. | |
| 2014/0039114 A1 * | 2/2014 | Hagihara | C08J 5/042 |
| | | | 524/495 |
| 2015/0273736 A1 | 10/2015 | Schneider et al. | |
| 2016/0083873 A1 | 3/2016 | Kawabe et al. | |
| 2016/0368729 A1 * | 12/2016 | Ufer | B65H 29/243 |
| 2017/0355550 A1 | 12/2017 | Kawahara et al. | |
| 2018/0119317 A1 | 5/2018 | Ootsubo et al. | |
| 2018/0162070 A1 | 6/2018 | Iwata et al. | |
| 2018/0194082 A1 | 7/2018 | Samejima et al. | |
| 2018/0297320 A1 | 10/2018 | Fujita et al. | |
| 2019/0054707 A1 | 2/2019 | Miyoshi et al. | |
| 2019/0084186 A1 | 3/2019 | Motohashi et al. | |
| 2019/0091944 A1 | 3/2019 | Motohashi et al. | |
| 2019/0161890 A1 * | 5/2019 | Motohashi | D02J 1/18 |
| 2019/0177888 A1 | 6/2019 | Motohashi et al. | |
| 2019/0263625 A1 | 8/2019 | Motohashi et al. | |
| 2020/0190700 A1 * | 6/2020 | Yasukochi | B29C 70/388 |

FOREIGN PATENT DOCUMENTS

| | | | | |
|---|---|---|---|---|
| CN | 107848146 | A | 3/2018 | |
| CN | 108602207 | A | 9/2018 | |
| CN | 108778656 | A | 11/2018 | |
| CN | 108779269 | A | 11/2018 | |
| EP | 2727693 | A1 | 5/2014 | |
| EP | 3444090 | A1 | 2/2019 | |
| JP | 50010965 | B | 4/1975 | |
| JP | 2006219780 | A | 8/2006 | |
| TW | 201725104 | A | 7/2017 | |
| WO | WO-2014171016 | A1 | 10/2014 | |
| WO | WO-2016104154 | A1 | 6/2016 | |
| WO | WO-2016136812 | A1 | 9/2016 | |
| WO | WO-2017006989 | A1 * | 1/2017 | ............ B29B 11/02 |
| WO | WO-2017221655 | A1 | 12/2017 | |
| WO | WO-2017221656 | A1 | 12/2017 | |
| WO | WO-2017221657 | A1 | 12/2017 | |

OTHER PUBLICATIONS

WO-2017006989 (Tadao) Jan. 2017 (online machine translation), [Retrieved on Oct. 27, 2023]. Retrieved from: Espacenet (Year: 2017).*
Office Action issued Jun. 15, 2021 in Japanese Patent Application No. 2020-081361 (with English machine translation from Global Dossier), 10 pages.
Combined Office Action and Search Report issued Oct. 8, 2021 in Chinese Patent Application No. 201980022594.7 (with English translation).
International Search Report issued May 21, 2019 in PCT/JP2019/013976 (with English translation), 4 pages.
Office Action issued Mar. 3, 2020 in Japanese Patent Application No. 2019-521486 (with English machine translation), 8 pages.
Extended European Search Report issued Apr. 1, 2021 in Patent Application No. 19781850.3, 6 pages.
Office Action issued Jan. 26, 2021 in Japanese Patent Application No. 2020-081361 (with English translation), 20 pages.
European Office Action issued Oct. 4, 2023 in European Patent Application No. 19781850.3, 9 pages.

* cited by examiner

METHOD FOR PRODUCING FIBER-REINFORCED RESIN MOLDING MATERIAL, AND APPARATUS FOR PRODUCING FIBER-REINFORCED RESIN MOLDING MATERIAL

This application is a continuation application of International Application No. PCT/JP2019/013976, filed on Mar. 29, 2019, which claims the benefit of priority of the prior Japanese Patent Application No. 2018-072556, filed Apr. 4, 2018, the content of which is incorporated herein by reference.

TECHNICAL FIELD

The present invention relates to a method for producing a fiber-reinforced resin molding material and an apparatus for producing a fiber-reinforced resin molding material.

BACKGROUND ART

As molding materials that provide excellent mechanical characteristics to molded articles and are suitable for the molding of complex shapes such as three-dimensional shapes, sheet molding compounds (SMC) or stampable sheets are known. The SMC is a sheet-shaped fiber-reinforced resin molding material in which a thermosetting resin such as an unsaturated polyester resin has penetrated between filaments of a cut fiber bundle comprising a reinforcing fiber such as a glass fiber or a carbon fiber. The stampable sheet is a sheet-shaped fiber-reinforced resin molding material obtained by, for example, impregnating the above-described cut fiber bundle with a thermoplastic resin.

In molding using the SMC, the SMC is compression-molded while being heated with a die. In molding using the stampable sheet, the stampable sheet is heated to a temperature equal to or higher than the melting point of the thermoplastic resin with an infrared heater or the like and is cooled and pressurized with a die having a predetermined temperature. In any types of molding, the fiber bundle is in a cut state, whereby the fluidity during molding increases, and the moldability improves.

As a method for producing a fiber-reinforced resin molding material such as the SMC, known is a method in which a continuous fiber bundle is cut into a predetermined length with a cutting machine and dispersed, and the formed group of fiber bundles is impregnated with a resin. In the production method, in order to reduce the production cost, a relatively inexpensive fiber bundle that is called large tow and comprises a large number of filaments is used. In this case, the fiber bundle is broadened in the width direction (referred to as "spreading"), the spread fiber bundle is split into a plurality of fiber bundles (referred to as "splitting"), and then the split fiber bundles are cut using a cutting machine.

As a method for splitting the fiber bundle, disclosed is, for example, a method in which a rotary blade is rotated and thrust through the fiber bundle (Patent Document 1). However, in a case where a filament in the fiber bundle skews or meanders, there is a concern that a part of the fiber bundle may be broken and the broken fiber bundle may wrap around a roll or the like.

As a splitting method using a rotary blade, a method in which a fiber bundle is split such that split portions and non-split portions are alternately arranged in the fiber bundle is also disclosed (Patent Document 2). However, even in this method, as the split portion becomes longer, the fiber bundle is more likely to be twisted or broken, and the supply of the fiber bundle to the cutting machine is likely to be unstable. On the other hand, as the non-split portion becomes longer, it is more likely that the cut fiber bundle is not sufficiently separated.

CITATION LIST

Patent Literature

[Patent Document 1]
  Japanese Unexamined Patent Application, First Publication No. 2006-219780
[Patent Document 2]
  PCT International Publication No. WO2017/006989

SUMMARY OF INVENTION

Technical Problem

An object of the present invention is to provide a method for producing a fiber-reinforced resin molding material and an apparatus for producing a fiber-reinforced resin molding material that are capable of splitting a fiber bundle such that a split portion becomes long while a non-split portion is shortened and are capable of stably producing a fiber-reinforced resin molding material.

Solution to Problem

The present invention has the following configurations.

[1] A method for producing a fiber-reinforced resin molding material in which a cut fiber bundle is impregnated with a resin, the method comprising:
a splitting step of splitting the fiber bundle with a splitting machine at intervals in a longitudinal direction; and
a cutting step of cutting the fiber bundle at intervals in the longitudinal direction after the splitting step,
in which the splitting machine comprises a rotary blade having a releasing section and a spacer member adjacent to the rotary blade.

[2] The method for producing a fiber-reinforced resin molding material according to [1], in which the releasing section is a cut-off portion formed in the rotary blade.

[3] The method for producing a fiber-reinforced resin molding material according to [2], in which, when a cut-off angle of the cut-off portion is represented by $\alpha$ (°) $100 \leq \alpha \leq 200$ is satisfied.

[4] The method for producing a fiber-reinforced resin molding material according to [2] or [3], in which, when a length of an outer circumference of a portion other than the cut-off portion in the rotary blade is represented by x (mm), and a length obtained by subtracting the x from a length (mm) of an entire circumference of the rotary blade in a state of not having the cut-off portion is represented by y (mm), $x > 2y$ is satisfied.

[5] The method for producing a fiber-reinforced resin molding material according to [1], in which a part of the spacer member reaches a circumferential edge of the rotary blade in a side view to form the releasing section.

[6] The method for producing a fiber-reinforced resin molding material according to [5], in which, when a radius of the rotary blade is represented by d5 (mm), and a maximum radius of the spacer member is represented by d4 (mm) $0 \leq d4 - d5 \leq 1$ is satisfied.

[7] The method for producing a fiber-reinforced resin molding material according to any one of [1] to [6], in which, when a circumferential speed of the spacer member is represented by V (m/min), and a transportation speed of the fiber bundle is represented by W (m/min), $0.02 \le V/W \le 0.5$ is satisfied.

[8] The method for producing a fiber-reinforced resin molding material according to any one of [1] to [7], in which the splitting step and the cutting step satisfy conditions (1) and (2).

$$0 < b/L < 1 \qquad (1)$$

$$1 < a/L \le 1000 \qquad (2)$$

(Here, in formulae, a represents a length (mm) of a split portion in the longitudinal direction of the split fiber bundle, b represents a length (mm) of a non-split portion in the longitudinal direction of the split fiber bundle, and L represents a cutting interval (mm) in the longitudinal direction of the fiber bundle).

[9] An apparatus for producing a fiber-reinforced resin molding material, the apparatus comprising:

a splitting machine comprising a rotary blade and a spacer member adjacent to the rotary blade and configured to split a fiber bundle at intervals by thrusting the rotary blade through the fiber bundle; and a cutting section configured to cut the fiber bundle treated with the splitting machine at intervals in a longitudinal direction of the fiber bundle, in which a releasing section is formed in the rotary blade.

[10] The apparatus for producing a fiber-reinforced resin molding material according to [91, in which the releasing section is a cut-off portion formed in the rotary blade.

[11] The apparatus for producing a fiber-reinforced resin molding material according to 110], in which, when a cut-off angle of the cut-off portion is represented by α (°), $100 \le \alpha \le 200$ is satisfied.

[12] The apparatus for producing a fiber-reinforced resin molding material according to [10] or [11], in which, when a length of an outer circumference of a portion other than the cut-off portion in the rotary blade is represented by x (mm), and a length obtained by subtracting the x from a length (mm) of an entire circumference of the rotary blade in a state of not having the cut-off portion is represented by y (mm), $x > 2y$ is satisfied.

[13] The apparatus for producing a fiber-reinforced resin molding material according to [9], in which a part of the spacer member reaches a circumferential edge of the rotary blade in a side view to form the releasing section.

[14] The apparatus for producing a fiber-reinforced resin molding material according to [13], in which, when a radius of the rotary blade is represented by d5 (mm), and a maximum radius of the spacer member is represented by d4 (mm), $0 \le d4-d5 \le 1$ is satisfied.

[15] The apparatus for producing a fiber-reinforced resin molding material according to any one of [9] to [14], in which the splitting machine and the cutting section satisfy conditions (1) and (2).

$$0 < b/L < 1 \qquad (1)$$

$$1 < a/L \le 1000 \qquad (2)$$

(Here, in formulae, a represents a length (mm) of a split portion in the longitudinal direction of the split fiber bundle, b represents a length (mm) of a non-split portion in the longitudinal direction of the split fiber bundle, and L represents a cutting interval (mm) in the longitudinal direction of the fiber bundle).

Advantageous Effects of Invention

According to the present invention, it is possible to split a fiber bundle such that a split portion becomes long while a non-split portion is shortened and to stably produce a fiber-reinforced resin molding material.

DESCRIPTION OF EMBODIMENTS

Figure 1:
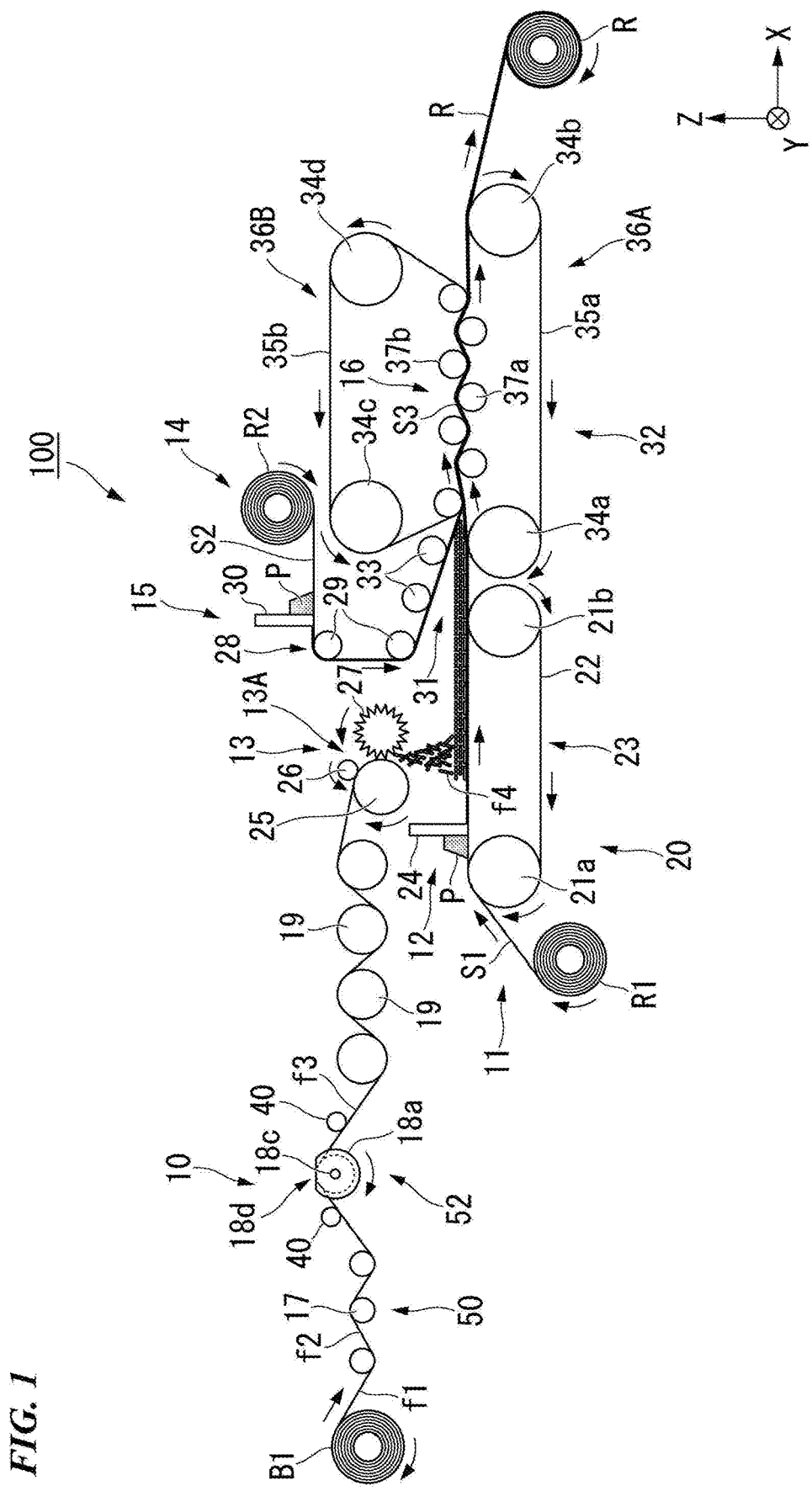
FIG. 1 is a side view showing an example of an apparatus for producing a fiber-reinforced resin molding material according to a first embodiment.

A method for producing a fiber-reinforced resin molding material (hereinafter, also simply referred to as "molding material") of the present invention is a method for producing a molding material in which a cut fiber bundle is impregnated with a resin.

According to the production method of the present invention, a sheet-shaped molding material in which a resin has penetrated between filaments of a cut fiber bundle is obtained. The obtained molding material can be preferably used as an SMC, a stampable sheet, or the like.

The fiber bundle refers to a bundle comprising a plurality of reinforcing fibers. As the reinforcing fiber that is used in the present invention, a carbon fiber is preferred. It should be noted that, as the reinforcing fiber, a reinforcing fiber other than the carbon fiber, such as a glass fiber, may be used.

The resin with which the fiber bundle is impregnated may be any of a thermosetting resin or a thermoplastic resin. As the resin, only a thermosetting resin may be used, only a thermoplastic resin may be used, or both a thermosetting resin and a thermoplastic resin may be used.

In a case where a molding material that is produced by the production method of the present invention is used as an SMC, a thermosetting resin is preferred. In a case where the molding material is used as a stampable sheet, a thermoplastic resin is preferred.

Examples of the thermosetting resin include an unsaturated polyester resin, an epoxy resin, a vinyl ester resin, a phenol resin, an epoxy acrylate resin, a urethane acrylate resin, a phenoxy resin, an alkyd resin, a urethane resin, a maleimide resin, and a cyanate resin. One kind of thermosetting resin may be used or two or more kinds of thermosetting resins may be used.

Examples of the thermoplastic resin include a polyolefin-based resin, a polyamide-based resin, a polyester-based resin, a polyphenylene sulfide resin, a polyether ketone resin, a polyether sulfone resin, and an aromatic polyamide resin. One kind of thermoplastic resin may be used or two or more kinds of thermoplastic resins may be used.

The production method of the present invention comprises a splitting step of splitting a fiber bundle with a splitting machine in the longitudinal direction at intervals and a cutting step of cutting the fiber bundle in the longitudinal direction at intervals after the splitting step. In the production method of the present invention, the splitting step and the cutting step preferably satisfy the following conditions (1) and (2).

$$0 < b/L < 1 \quad (1)$$

$$1 < a/L \leq 1000 \quad (2)$$

(Here, in formulae, a represents the length (mm) of a split portion in the longitudinal direction of the split fiber bundle, b represents the length (mm) of a non-split portion in the longitudinal direction of the split fiber bundle, and L represents the cutting interval (mm) in the longitudinal direction of the fiber bundle.)

b/L is preferably more than 0 and less than 1, more preferably 0.03 or more and 0.8 or less, and still more preferably 0.1 or more and 0.6 or less. When b/L is equal to or more than the lower limit value of the above-described range, it is easy to suppress a process trouble in which the fiber bundle breaks and wraps around a rotary blade, roll, or the like. When b/L is equal to or less than the upper limit value of the above-described range, since it is possible to decrease the proportion of non-split portions included in the cut fiber bundle, there is a tendency for the physical properties of a molded article obtained by molding the obtained molding material to improve.

b is preferably more than 0 mm and 50 mm or less, more preferably 1 mm or more and 35 mm or less, and still more preferably 5 mm or more and 25 mm or less. When b is equal to or more than the lower limit value of the above-described range, it is easy to suppress the process trouble in which the fiber bundle breaks and wraps around a rotary blade, roll, or the like. When b is equal to or less than the upper limit value of the above-described range, since it is possible to decrease the proportion of non-split portions included in the cut fiber bundle, there is a tendency for the physical properties of a molded article obtained by molding the obtained molding material to improve.

a/L is preferably more than 1 and 1000 or less, more preferably more than 1 and 200 or less, still more preferably more than 3 and 100 or less, and particularly preferably 5 or more and 50 or less. When a/L is equal to or more than the lower limit value of the above-described range, since it is possible to decrease the proportion of non-split portions included in the cut fiber bundle, there is a tendency for the physical properties of a molded article obtained by molding the obtained molding material to improve. When a/L is equal to or less than the upper limit value of the above-described range, it is easy to suppress a process trouble in which the fiber bundle breaks or loosens and wraps around a rotary blade, roll, or the like.

a is preferably 1 mm or more and 5000 mm or less, more preferably 10 mm or more and 3000 mm or less, and still more preferably 100 mm or more and 1000 mm or less. When a is equal to or more than the lower limit value of the above-described range, it is easy to obtain a splitting effect, and there is a tendency for the physical properties of a molded article obtained by molding the obtained molding material to improve. When a is equal to or less than the upper limit value of the above-described range, it is easy to suppress a process trouble in which the fiber bundle breaks or loosens and wraps around a rotary blade, roll, or the like.

In the method for producing the molding material of the present invention, a splitting machine comprising a rotary blade having a releasing section and a spacer member adjacent to the rotary blade is used.

The releasing section in the present invention refers to a section introduced in the rotary blade so that splitting of a fiber bundle by the rotary blade is temporarily cancelled. That is, the releasing section is a section of the rotary blade which is not allowed to thrust through a fiber bundle when continuously splitting the fiber bundle by thrusting the rotary blade through the fiber bundle while rotating the rotary blade. When the fiber bundle passes over the releasing section, the above-described non-split portion is formed in the fiber bundle.

In the method for producing the molding material of the present invention, the configuration of the rotary blade having the releasing section is not particularly limited, however, as the splitting machine having the rotary blade, the following two types of splitting machines are exemplary examples. Each aspect will be described using an example.

First Embodiment

In a first embodiment, a production apparatus comprising a splitting machine having a rotary blade with a cut-off portion as the rotary blade having the releasing section is used. An example of the production apparatus that is used in the first embodiment will be described based on FIGS. 1 to 3. It should be noted that, in the following description, dimensions and the like in the exemplified drawings are simply examples, and the present invention is not necessarily limited thereto and can be appropriately modified and carried out within the scope of the gist of the present invention.

In the following description, an XYZ orthogonal coordinate system is set, and positional relationships between individual members will be described with reference to the XYZ orthogonal coordinate system shown in the respective drawings.

(Production Apparatus)

An apparatus 100 for producing a fiber-reinforced resin molding material (hereinafter, simply referred to as "production apparatus 100") of the present embodiment is an apparatus configured to produce a sheet-shaped SMC comprising a fiber bundle comprising a plurality of carbon fibers and a thermosetting resin comprising an unsaturated polyester resin, in which the thermosetting resin has penetrated between filaments of the cut fiber bundle. As the fiber bundle, in addition to the carbon fiber, a reinforcing fiber such as a glass fiber may be used. As the resin, in addition to the thermosetting resin, a thermoplastic resin may be used.

As shown in FIG. 1, the production apparatus 100 comprises a fiber bundle supply section 10, a first sheet supply section 11, a first application section 12, a cutting section 13, a second sheet supply section 14, a second application section 15, and an impregnation section 16.

The fiber bundle supply section 10 comprises a spreading section 50 configured to spread a continuous fiber bundle f1 in a width direction (Y-axis direction) while transporting the fiber bundle in a predetermined direction (X-axis direction; hereinafter, referred to as the transportation direction) and a splitting machine 52 configured to split a spread fiber bundle f2.

The spreading section 50 comprises a plurality of spreading bars 17 that extends in the width direction (Y-axis direction) of the fiber bundle f1 and is disposed at intervals in the transportation direction (X-axis direction).

Figure 2A:
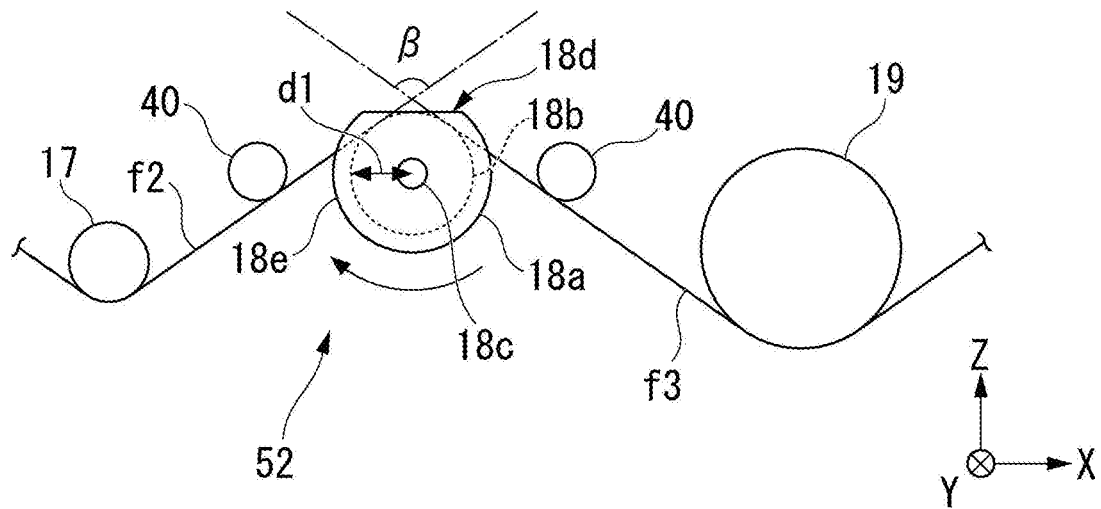
FIG. 2A is a side view showing a splitting machine in the production apparatus of FIG. 1 in an enlarged manner.
Figure 2B:
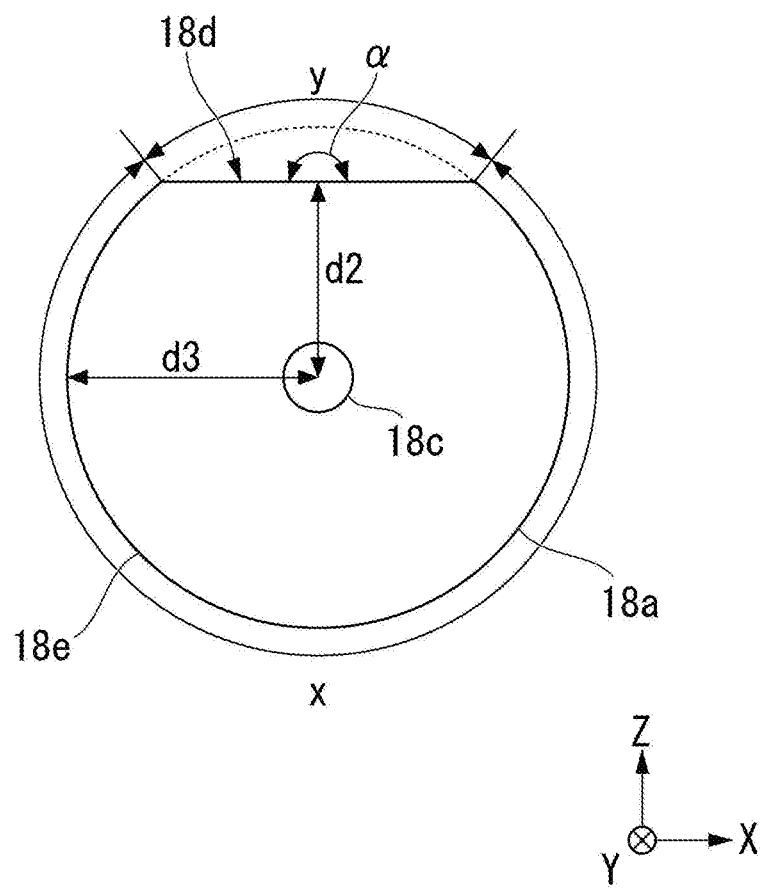
FIG. 2B is a side view showing a rotary blade in the splitting machine shown in FIG. 2A.
Figure 3:
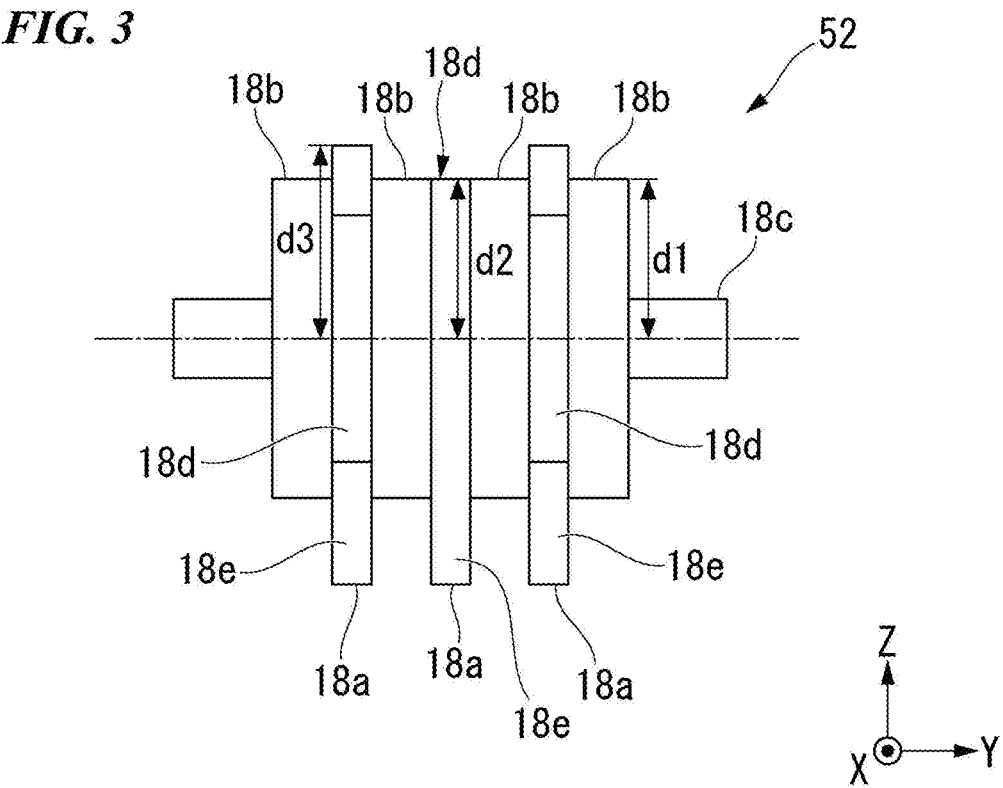
FIG. 3 is a front view of the splitting machine in the production apparatus of FIG. 1 seen in a transportation direction of a fiber bundle.

As shown in FIG. 2A, FIG. 2B, and FIG. 3, the splitting machine 52 comprises a plurality of rotary blades 18a, a plurality of spacer members 18b each having a cylindrical circumference and each disposed between the rotary blade 18a and the rotary blade 18a, and a plurality of godet rollers 19, respectively. The plurality of rotary blades 18a and the plurality of spacer members 18b are alternately disposed adjacent to each other in the width direction (Y-axis direction) of the spread fiber bundle 2 in a state in which a rotary shaft 18c is inserted such that the rotation centers of the rotary blades and the spacer members coincide or substantially coincide. The spacer member 18b rotates together with the rotary blade 18a.

The plurality of rotary blades 18a is installed so as to be rotatable around the rotary shaft 18c.

The rotary blade 18a has a cut-off circle shape in which a cut-off portion 18d that linearly cuts off a part of a disc is formed. As described above, the cut-off portion 18d is formed in the rotary blade 18a, and the cut-off portion 18d serves as the releasing section. In this example, the positions of the cut-off portions 18d of the rotary blades 18a are not aligned around the axis of the rotary shaft 18c. It should be noted that the positions of the cut-off portions 18d of the rotary blades 18a may be aligned around the axis of the rotary shaft 18c.

As shown in FIG. 2B, a length of an outer circumference of a portion 18e other than the cut-off portion 18d in the rotary blade 18a is represented by x (mm), and a length obtained by subtracting x from a length (mm) of an entire circumference of the rotary blade 18a assumed to be in a state of not having the cut-off portion 18d is represented by y (mm). The cut-off portion 18d of the rotary blade 18a is formed so as to satisfy x>2y. With the use of such a rotary blade 18a, it is possible to satisfy the above-described conditions (1) and (2).

x/y is preferably more than 2, more preferably 2.5 or more and 50 or less, and still more preferably 3 or more and 25 or less. As x/y becomes larger within the above-described range, it is possible to form a split portion longer, and there is a tendency for the physical properties of a molded article obtained by molding a molding material to be obtained to improve. As x/y becomes smaller within the above range, the fiber bundle f2 is less likely to be twisted or broken, and the production of the molding material becomes more stable.

In this example, the radius d1 (mm) of the spacer member 18 having an cylindrical circumference coincides with the shortest radius d2 (mm) in the cut-off portion 18d of the rotary blade 18a. In the present invention, the "radius of the spacer member" means the length from the rotation axis to the circumferential edge of the spacer member. The "radius of the rotary blade" means the length from the rotation axis to the circumferential edge of the rotary blade.

d1−d2 is preferably −0.5 mm or more and 0.3 mm or less and more preferably −0.2 mm or more and 0.2 mm or less. When d1−d2 is equal to or less than the upper limit value of the above-described range, it is easy to suppress the fiber bundle f2 digging in between the spacer members 18b adjacent to each other when the fiber bundle f2 passes over the cut-off portion 18d of the rotary blade 18a, and there is a tendency for the width of a cut fiber bundle f4 to become more stable. When d1−d2 is equal to or larger than the lower limit value of the above-described range, there is a tendency for the splitting of the fiber bundle f2 to become more stable.

The radius d3 (mm) of the portion 1e other than the cut-off portion 18d in the rotary blade 18a is larger than the radius d1 of the spacer member 18, d3−d1 is preferably 0.5 mm or more and 40 mm or less, more preferably 1 mm or more and 20 mm or less, and still more preferably 1.5 mm or more and 10 mm or less. When d3−d1 is within the above-described range, it is easy for the rotary blade 18a to thrust through the fiber bundle 2, and there is a tendency for the splitting of the fiber bundle f2 to become more stable.

In a side view seen in the width direction (Y-axis direction) of the fiber bundle, since the cut-off portion 18d of the rotary blade 18a is a part where a disc is linearly cut off, the cut-off angle α (FIG. 2B) is 180°. The cut-off angle α is the angle of the cut-off part in the side view of the rotary blade. The cut-off angle α of the cut-off portion, which is formed in the rotary blade, is not limited to 180°.

In the present invention, the cut-off angle α (°) of the cut-off portion, which is formed in the rotary blade, preferably satisfies 100≤α≤200. As the cut-off portion having a cut-off angle α of other than 180°, a fan-shaped cut-off portion having a central angle (cut-off angle α) of less than 180° or more than 180° is exemplified. The central angle of the fan-shaped cut-off portion may be rounded. In this case, the cut-off angle α is considered to be the same angle as the central angle when the central angle is not rounded, that is, the angle formed by two straight lines extending toward the center of the fan.

The cut-off portion in the rotary blade is formed so as not to reach the rotary shaft that is inserted into the rotary blades regardless of the value of the cut-off angle α.

The cut-off angle α is preferably 100° or more and 2000 or less and more preferably 120° or more and 180° or less. When the cut-off angle α is equal to or more than the lower limit value of the above-described range, a sufficient number of non-split portions are likely to be formed in a split fiber bundle f3, and there is a tendency for the splitting to become stable. When the cut-off angle α is equal to or less than the upper limit value of the above-described range, there is a tendency for a cut fiber bundle f4 to be likely to be sufficiently separated.

The number of the cut-off portion in the rotary blade that is used in the first embodiment is not limited to one as long as the effect of the present invention is not impaired and may be two or more.

On both sides of the plurality of rotary blades 18a in the transportation direction, a pair of guide members 40 is disposed so as to sandwich the plurality of rotary blades 18a and the plurality of spacer members 18b. The pair of guide members 40 is arranged so as to force the fiber bundle f2 being transported against the plurality of rotary blades 18a and the plurality of spacer member 18b from above. Therefore, in the side view of the splitting machine 52 seen in the width direction of the fiber bundle f2, the fiber bundle f2 being split is bent around the spacer member 18b with a wrap angle. When the fiber bundle f2 is bent around the spacer member 18b with a wrap angle as described above, since the period of time during which the rotary blades 18a thrust through the fiber bundle f2 becomes long, it becomes easy to adjust a and a/L to be large and adjust b and b/L to be small.

Figure 4:
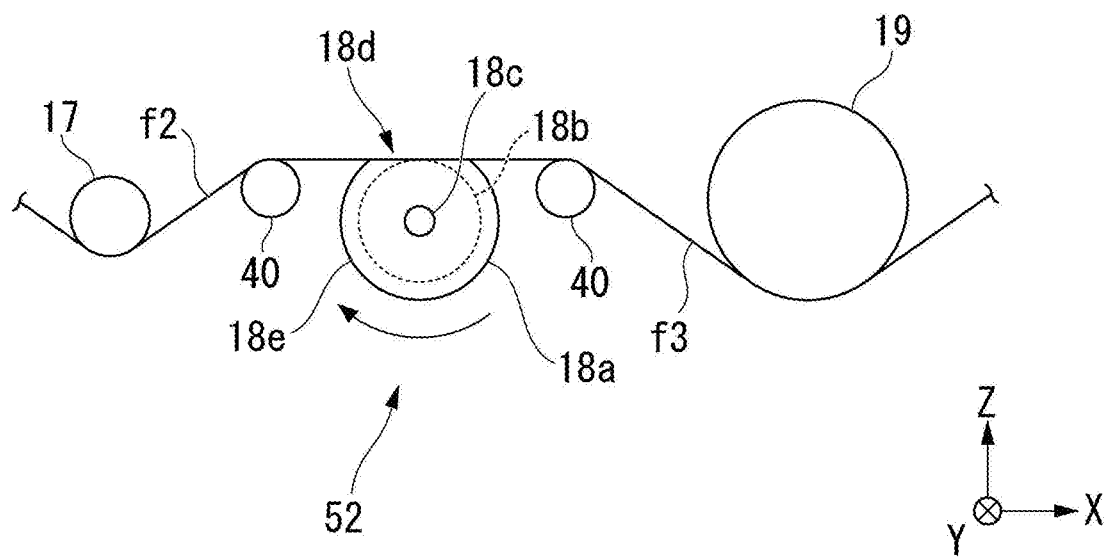
FIG. 4 is a side view showing an aspect in which a wrap angle of the fiber bundle is not formed in the splitting machine.

It should be noted that, as shown in FIG. 4, it is also allowed to form no wrap angle of the fiber bundle f2 around the spacer members 18b, such that, for a certain period of time, the planar outer circumferential surfaces of the cut-off portions 18d of the rotary blades 18a is along the fiber bundle f2 which is linearly transported. In such a case, it becomes easy to adjust a and a/L to be small and adjust b to be large.

A wrap angle β of the fiber bundle around the spacer member 18b is preferably 100° or more and 180° or less, more preferably 1250 or more and 180° or less, and still more preferably 150° or more and 180° or less. When the wrap angle β is equal to or more than the lower limit value of the above-described range, fluff is less likely to be generated in the split fiber bundle f3 and the split fiber bundle f3 is less likely to wrap around a roll or the like.

The wrap angle β is an angle formed by the longitudinal direction of the fiber bundle upstream of the spacer members 18b and the longitudinal direction of the fiber bundle downstream of the spacer members 18b in the side view seen in the width direction of the fiber bundle being transported.

The rotation direction of the rotary blades 18a may be the same direction as or the direction opposite to the transportation direction of the fiber bundle f2, but the same direction is preferable.

As a mechanism configured to rotate the rotary blades 18a, a mechanism using a drive motor or the like can be exemplified.

In such a fiber bundle supply section 10, first, the fiber bundle f1, which is a large tow, is pulled out from a bobbin B1 in an X-axis positive direction (toward the right in the horizontal direction) in FIG. 1 and is spread in the width direction with the spreading section 50. Specifically, while the fiber bundle f1 passes the plurality of spreading bars 17 in the spreading section 50, the fiber bundle f1 is heated, rubbed, shaken, and the like through each spreading bar 17, and the fiber bundle f1 is spread to be broadened in the width direction.

The spread fiber bundle f2 is sent to the splitting machine 52 and is split by the plurality of rotary blades 18a. In the splitting machine 52, for example, each rotary blade 18a, which rotates in the same direction as the transportation direction of the fiber bundle f2, thrusts through the fiber bundle 2. When the cut-off portion 18d of each rotary blade 18a comes to the position of the fiber bundle f2, the rotary blade 18a temporarily does not thrust through the fiber bundle f2, and the fiber bundle f2 is released from being thrust through by the rotary blade, and the splitting of the fiber bundle f2 with the rotary blade 18a is temporarily cancelled. That is, the rotary blades 18a intermittently thrust through the fiber bundle f2. Therefore, in the split fiber bundle f3, split portions and non-split portions are formed. The split fiber bundle f3 is supplied to the cutting section 13 while being guided with the plurality of godet rollers 19.

The first sheet supply section 11 comprises a first transportation section 20. The first transportation section 20 unwinds a continuous first sheet S1 from a first sheet roll R1, supplies the first sheet S1 toward the first application section 12, and furthermore, transports the first sheet S1 toward the impregnation section 16.

The first transportation section 20 has a conveyor 23 having an endless belt 22 looped between a pair of pulleys 21a and 21b. The conveyor 23 rotates the pair of pulleys 21a and 21b in the same direction to make the endless belt 22 revolve and to transport the first sheet S1 in the X-axis positive direction shown in FIG. 1 on the surface of the endless belt 22.

The first application section 12 has a coater 24 that is disposed above the first sheet S1 that is transported in the X-axis positive direction shown in FIG. 1 and supplies a paste P comprising a resin. In the first application section 12, the first sheet S1 passes the coater 24, whereby the paste P is applied onto a surface of the first sheet S1 in a predetermined thickness.

To the paste P it is possible to blend a mixture obtained by appropriately mixing, in addition to the thermosetting resin such as an unsaturated polyester resin, a filler such as calcium carbonate, a low shrinking agent, a mold release agent, a curing initiator, a viscosity improver, and the like.

The cutting section 13 cuts the fiber bundle f3 that has been treated with the splitting machine 52 at intervals in the longitudinal direction of the fiber bundle f3.

The cutting section 13 is provided downstream of the first application section 12 in the transportation direction, cuts the fiber bundle f3 that is supplied from the fiber bundle supply section 10 with a cutting machine 13A, and sprinkles cut fiber bundles over the paste P. The cutting machine 13A is disposed above the first sheet S1 that is transported with the conveyor 23 and has a guide roller 25, a pinch roller 26, and a cutter roller 27.

The guide roller 25 rotates and guides the fiber bundle f3 supplied from the fiber bundle supply section 10 downward. The pinch roller 26 sandwiches the fiber bundle f3 with the guide roller 25 and rotates in the direction opposite to the guide roller 25, thereby drawing the split fiber bundle f3 in cooperation with the guide roller 25. The cutter roller 27 rotates and cuts the fiber bundle 3 into a predetermined length. The cut fiber bundles f4 fall from between the guide roller 25 and the cutter roller 27 and are sprinkled over the first sheet S1 onto which the paste P is applied. The first sheet S1 sprinkled with the cut fiber bundles f4 is transported to the impregnation section 16 with the first transportation section 20.

In the production apparatus 100, the splitting machine 52 and the cutting section 13 are preferably configured to satisfy the above-described conditions (1) and (2). That is, the value of x/y of the rotary blade 18a, the cut-off angle α, the number of the cut-off portions 18d, the wrap angle β of the fiber bundle, the rotation speed of the rotary blade 18a, the cutting interval of the fiber bundle f3 in the longitudinal direction in the cutting section 13, and the like in the splitting machine 52 are preferably adjusted so as to satisfy the conditions (1) and (2).

The second sheet supply section 14 comprises a second transportation section 28. The second transportation section 28 unwinds a continuous second sheet S2 from a second sheet roll R2, supplies the second sheet S2 toward the second application section 15, and furthermore, transports the second sheet S2 toward the impregnation section 16.

The second transportation section 28 is disposed above the first sheet S1 that is transported with the conveyor 23 and has a plurality of guide rollers 29. The second transportation section 28 transports the second sheet S2 supplied from the second sheet supply section 14 in an X-axis negative direction (toward the left in the horizontal direction) in FIG. 1 and then changes the direction in which the second sheet S2 is transported with the plurality of rotating guide roller 29 to a Z-axis negative direction (downward in the vertical direction) and then the X-axis positive direction in FIG. 1.

The second application section 15 has a coater 30 that is disposed above the second sheet S2 that is transported in the X-axis negative direction and supplies a paste P. In the second application section 15, the second sheet S2 passes the coater 30, whereby the paste P is applied onto a surface of the second sheet S2 in a predetermined thickness.

The second sheet S2 to which the paste P is applied with the second application section 15 is transported to the impregnation section 16 with the second transportation section 28.

The impregnation section 16 is positioned downstream of the cutting section 13 in the transportation direction and has a sticking mechanism 31 and a pressurization mechanism 32. The sticking mechanism 31 is disposed above the downstream-side pulley 21b in the conveyor 23 and has a plurality of sticking rollers 33.

Each sticking roller 33 is disposed in a state of being in contact with a rear surface (paste P-free surface) of the second sheet S2 to which the paste P is applied. In addition, each sticking roller 33 is disposed such that the second sheet S2 gradually comes closer to the first sheet S1.

Therefore, the second sheet S2 is overlaid on the first sheet S1. The first sheet S1 and the second sheet S2 are transported to the pressurization mechanism 32 in a state of being stuck to each other while sandwiching the fiber bundle f4 and the paste P therebetween. Hereinafter, the first sheet S1 and the second sheet S2 stuck to each other will be collectively referred to as a stuck sheet S3.

The pressurization mechanism 32 is provided downstream of the first transportation section 20 (conveyor 23). The pressurization mechanism 32 has a lower conveyor 36A having an endless belt 35a looped between a pair of pulleys 34a and 34b and an upper conveyor 36B having an endless belt 35b looped between a pair of pulleys 34c and 34d.

The lower conveyor 36A and the upper conveyor 36B are disposed to face each other in a state in which the endless belts 35a and 35b are made adjacent to each other. The pressurization mechanism 32 rotates the pair of pulleys 34a and 34b of the lower conveyor 36A in the same direction to make the endless belt 35a revolve. As a result, the pair of pulleys 34c and 34d of the upper conveyor 36B rotates in the same direction as each other and in the direction opposite to the pair of pulleys 34a and 34b, and the endless belt 35b is made to revolve reversely at the same speed as the endless belt 35a. Therefore, the stuck sheet S3 sandwiched between the endless belts 35a and 35b is transported in the X-axis positive direction in FIG. 1.

The pressurization mechanism 32 has a plurality of lower rollers 37a and a plurality of upper rollers 37b. Each lower roller 37a is disposed in a state of being in contact with the rear surface of the endless belt 35a in the portion where both endless belts are adjacent to each other (the region in which the endless belt 35a sandwiches the stuck sheet S3 with the endless belt 35b). Similarly, the plurality of upper rollers 37b is disposed in a state of being in contact with the rear surface of the endless belt 35b in the portion where both endless belts are adjacent to each other (the region in which the endless belt 35b sandwiches the stuck sheet S3 with the endless belt 35a). The plurality of lower rollers 37a and the plurality of upper rollers 37b are disposed so as to be alternately arranged in the transportation direction of the stuck sheet S3.

The pressurization mechanism 32 pressurizes the paste P and the fiber bundle f4 sandwiched between the first sheet S1 and the second sheet S2 with the plurality of lower rollers 37a and the plurality of upper rollers 37b while the stuck sheet S3 passes between the endless belts 35a and 35b. The paste P penetrates between the filaments of the fiber bundle f4 from both sides of the fiber bundle f4. Therefore, an SMC sheet R in which the thermosetting resin has penetrated between the filaments of the fiber bundle f4 is obtained.

(Production Method)

A method for producing the molding material using the production apparatus 100 of the first embodiment has the following steps.

Application step: The paste P is applied onto the first sheet S1 that is transported in a predetermined direction.

Spreading step: The fiber bundle f1 is spread in the width direction with the spreading section 50.

Splitting step: The spread fiber bundle f2 is split at intervals in the longitudinal direction with the rotary blades 18a in the splitting machine 52.

Cutting step: The split fiber bundle f3 is cut at intervals in the longitudinal direction with the cutting section 13.

Sprinkling step: The cut fiber bundles f4 are sprinkled over the paste P that is applied in the application step.

Impregnation step: The second sheet S2 to which the paste P is applied is overlaid on the first sheet S1 sprinkled with the cut fiber bundles f4, and the paste P and the cut fiber bundles f4 sandwiched between the first sheet S1 and the second sheet S2 are pressurized, thereby allowing the resin to penetrate between the filaments of the fiber bundle f4.

In the application step, the long first sheet S1 is unwound from the first sheet roll R1 and transported with the first transportation section 20, and the paste P comprising a desired resin is applied onto the first sheet S1 with the first application section 12 in a predetermined thickness.

In the spreading step, the fiber bundle f1 is pulled out from the bobbin B1 and passed between the plurality of spreading bars 17 in the spreading section 50, and the fiber bundle f1 is spread to be broadened in the width direction. In the splitting step, the spread fiber bundle f2 is transported and split at intervals in the longitudinal direction by rotating the plurality of rotary blades 18a and intermittently thrusting them through the fiber bundle 2. In the cutting step, in the cutting section 13, the split fiber bundle f3 is cut with the cutting machine 13A. Next, in the sprinkling step, the cut fiber bundles f4 are sprinkled over the paste P which has been applied to the first sheet S1.

Figure 5:
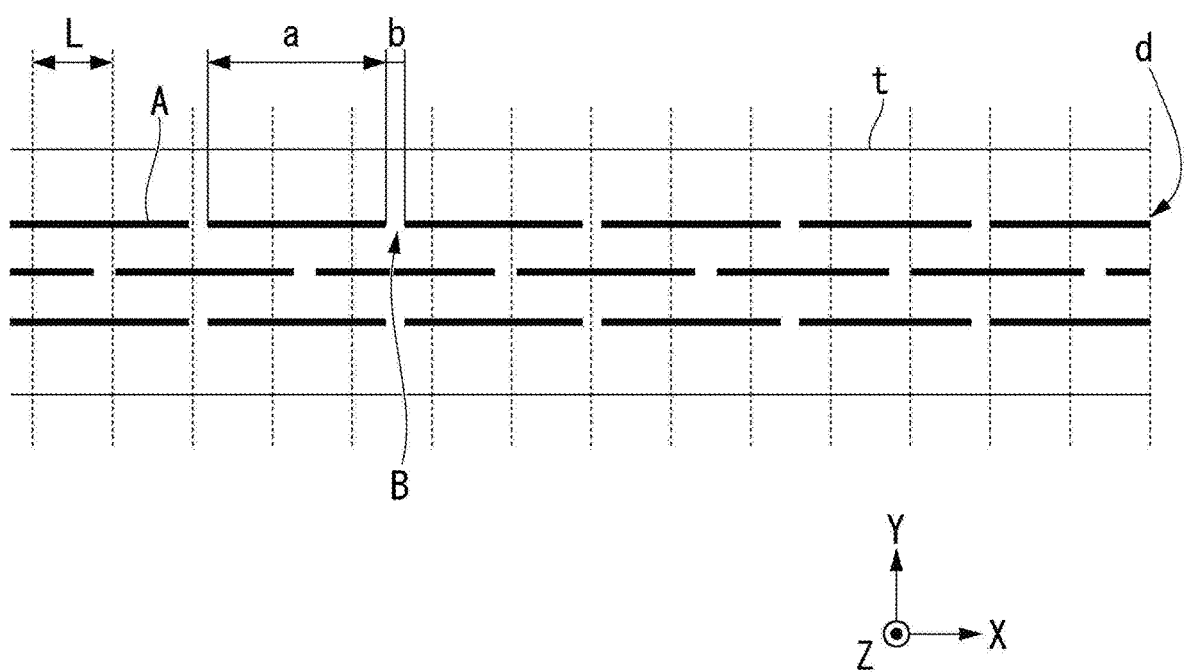
FIG. 5 is a schematic diagram showing the split fiber bundle.

Splitting positions in the split fiber bundle 3 will be described with reference to FIG. 5. In FIG. 5, a tow t, namely the split fiber bundle f3 is indicated by a thin line, split portions A in the split fiber bundle f3 are indicated by a thick line, and cutting lines along which the split fiber bundle f3 is to be cut with the cutting machine 13A are indicated by a broken line.

In the split fiber bundle f3, split portions A formed with the rotary blades 18a and non-split portions B formed due to the cut-off portions 18d of the rotary blades 18a are alternately arranged in the transportation direction to make a split treatment line d like a perforation.

Even when filaments in the split fiber bundle f3 skew, meander, or are entangled, since a plurality of bundles comprised in the split fiber bundle f3 is partially connected to each other, it is possible to transport the plurality of bundles comprised in the split fiber bundle f3 in a state of being spread in the width direction and in a stable state to the cutting machine 13A. In addition, even when a filament in the fiber bundle f3 skews, meanders, or the like, the fiber bundle f3 is not damaged. Therefore, partial breaking of the split fiber bundle f3 and wrapping of the broken fiber bundle f3 around a roller and the like in the cutting section 13 is prevented. Therefore, it is possible to produce a molding material at a low cost using a relatively inexpensive large tow.

In the splitting step, when the circumferential speed of the spacer member 18b is represented by V (m/min), and the transportation speed of the fiber bundle f2 is represented by W (m/min), $0.02 \leq V/W \leq 0.5$ is preferably satisfied.

V/W is preferably 0.02 or more and 0.5 or less, more preferably 0.03 or more and 0.4 or less, and still more preferably 0.04 or more and 0.3 or less. When V/W is equal to or more than the lower limit value of the above-described range, it is easy to suppress a process trouble in which the fiber bundle breaks or loosens and wraps around the rotary blade, the roll, or the like. When V/W is equal to or less than the upper limit value of the above-described range, since it is possible to decrease the proportion of non-split portions included in the cut fiber bundle, the physical properties of a molded article obtained by molding the obtained molding material improve.

The splitting step and the cutting step of the present embodiment are preferably carried out so as to further satisfy the above-described conditions (1) and (2). Specifically, it is preferable to carry out the splitting step and the cutting step by adjusting the value of x/y of the rotary blade 18a in the splitting machine 52, the cut-off angle α, the wrap angle β of the fiber bundle, the rotation speed of the rotary blade 18a, the cutting interval of the fiber bundle f3 in the longitudinal direction in the cutting section 13, and the like so as to satisfy the conditions (1) and (2).

Therefore, it is possible to shorten the non-split portions and lengthen the split portions in the split fiber bundle while suppressing the occurrence of the twisting or breaking of the fiber bundle. Therefore, the fiber bundle is sufficiently separated, and an SMC having excellent physical properties can be stably produced.

In the impregnation step, the long second sheet S2 is unwound from the second sheet roll R2 with the second sheet supply section 14, and the paste P is applied onto the second sheet S2 in a predetermined thickness with the second application section 15. Next, in the impregnation section 16, the second sheet S2 is overlaid on the first sheet S1 with the sticking mechanism 31. Next, the paste P and the fiber bundle sandwiched between the first sheet S1 and the second sheet S2 are pressurized with the pressurization mechanism 32, and the resin penetrates between the filaments of the fiber bundle. Therefore, an SMC sheet R in which the resin has preferably penetrated between the filament of the fiber bundle f4 is obtained.

The SMC sheet R is wound in a roll shape and then sent to the next step. In addition, the sheet R is cut into a predetermined length and shipped. It should be noted that the first sheet S1 and the second sheet S2 are peeled off before a molding process is carried out on the SMC.

As described above, in the first embodiment, the splitting step and the cutting step are carried out using the specific rotary blades having the cut-off portion formed as the releasing section. Therefore, it is possible to shorten the non-split portions and lengthen the split portions in the split fiber bundle while suppressing the occurrence of the twisting or breaking of the fiber bundle, and thus it is possible to stably produce an SMC having excellent physical properties.

Second Embodiment

In a second embodiment, used is a production apparatus comprising a splitting machine that comprises a plurality of rotary blades and spacer members provided between the rotary blades adjacent to each other and in which the radius of a part of the spacer member is equal to or larger than the radius of the rotary blade. A region of the rotary blade adjacent to the part of the spacer member having a radius that is equal to or larger than the radius of the rotary blade corresponds to the releasing section in the present invention.

An example of the production apparatus that is used in the second embodiment will be described based on FIG. 6A and FIG. 6B.

(Production Apparatus)

An apparatus for producing a fiber-reinforced resin molding material according to the present embodiment is the same as the production apparatus 100 of the first embodiment except that a splitting machine 52A is provided instead of the splitting machine 52.

Figure 6A:
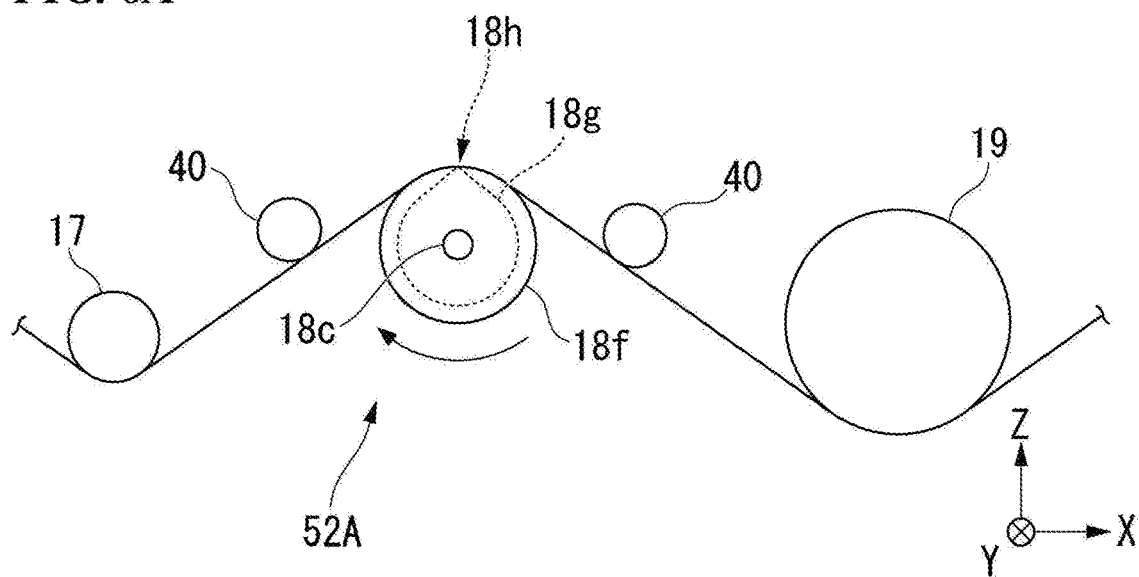
FIG. 6A is a side view showing a splitting machine in an apparatus for producing a fiber-reinforced resin molding material according to a second embodiment.
Figure 6B:
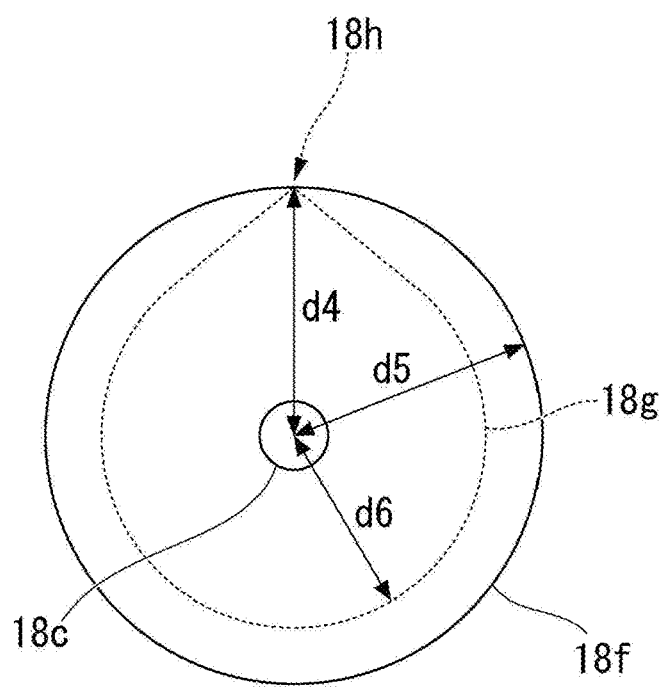
FIG. 6B is a side view showing a rotary blade and a spacer member in the splitting machine of FIG. 6A.

As shown in FIG. 6A and FIG. 6B, the splitting machine 52A comprises a plurality of rotary blades 18f, a plurality of spacer members 18g each having a cylindrical circumference and each disposed between the rotary blade 18f and the rotary blade 18f, and a plurality of godet rollers 19, respectively. The plurality of rotary blades 18f and the plurality of spacer members 18g are alternately disposed adjacent to each other in the width direction (Y-axis direction) of a spread fiber bundle f2 in a state in which a rotary shaft 18c is inserted such that the rotation centers of the rotary blades and the spacer members coincide or substantially coincide. The spacer member 18g rotates together with the rotary blade 18f.

The plurality of rotary blades 18f has a disc shape and has a central portion formed to enable the insertion of the rotary shaft 18c. Each rotary blade 18f is installed so as to be rotatable around the rotary shaft 18c.

As shown in FIG. 6B, the spacer member 18g has a shape in which a part of the disc radially protrudes more than a radius d6 (mm) of the disc-shaped portion and a part of the spacer member 18g reaches the circumferential edge of the rotary blade 18f in a side view. Therefore, a maximum radius d4 (mm) of a protrusion portion 18h, which is a part of the spacer member 18g, is equal to or larger than a radius d5 (mm) of the rotary blade 18f. Each spacer member 18g is installed so as to be rotatable around the rotary shaft 18c together with the rotary blade 18f.

Around the axis of the rotary shaft 18c, the positions of the protrusion portions 18h in the respective spacer members 18g may or may not be aligned.

In the splitting machine 52A, when the protrusion portion 18h of the spacer member 18g is not in contact with the fiber bundle f2, the rotary blade 18f thrusts through the fiber bundle f2. On the other hand, when the protrusion portion 18h, at which d4 of the spacer member 18g becomes equal to d5, is in contact with the fiber bundle f2, the fiber bundle f2 is lifted by the spacer member 18g, the fiber bundle f2 passes over a releasing section of the rotary blade 18f, and the rotary blade 18f is pulled out from the fiber bundle f2. Therefore, in a split fiber bundle f3, split portions and non-split portions are formed.

In the splitting machine of the second embodiment, $0 \leq d4-d5 \leq 1$ is preferably satisfied.

d4–d5 is preferably 0 nm or more and 1 nm or less and more preferably 0 mm or more and 0.5 mm or less. When d4–d5 is equal to or more than the lower limit value of the above-described range, there is a tendency for it to be possible to form a sufficient number of split portions in the split fiber bundle f3. When d4–d5 is equal to or less than the upper limit value of the above-described range, it becomes easy to lengthen the split portions while shortening the non-split portions in the split fiber bundle.

The protrusion portion 18h of the spacer member 18g may have a cornered shape or a rounded shape. In a case where the protrusion portion 18h of the spacer member 18g has a rounded shape, the radius of curvature of the edge shape of the protrusion portion 18h is preferably 0.1 mm or more and less than the radius of the rotary blade 18f.

The number of the protrusion portions having a radius that is equal to or larger than the radius of the rotary blade in the spacer member is not limited to one as long as the effect of the present invention is not impaired and may be two or more.

In the splitting machine 52A, similar to the splitting machine 52, a wrap angle may or may not be formed for the fiber bundle. The preferred range of the wrap angle of the fiber bundle is the same as the preferred range of the wrap angle β of the fiber bundle in the first embodiment.

The rotation directions of the rotary blades 18f and the spacer members 18g may be the same direction as or the direction opposite to the transportation direction of the fiber bundle f2, but the same direction is preferable.

As a mechanism configured to rotate the rotary blades 18f and the spacer members 18g, a mechanism using a drive motor or the like is an exemplary example.

In the fiber bundle supply section 10 comprising the splitting machine 52A instead of the splitting machine 52, similar to the first embodiment, the spread fiber bundle f2 is split by being thrust through by the rotary blades 18f of the splitting machine 52A. When the protrusion portion 18h of the spacer member 18g comes into contact with the fiber bundle f2, the fiber bundle f2 is lifted, the fiber bundle f2 passes over the releasing section of the rotary blade 18f, and the rotary blade 18f is temporarily pulled out from the fiber bundle f2. That is, the rotary blades 18f intermittently thrust through the fiber bundle f2. Therefore, in the split fiber bundle f3, split portions and non-split portions are formed. The split fiber bundle f3 is, similar to the first embodiment, supplied to the cutting section 13 while being guided with the plurality of godet rollers 19.

In the production apparatus of the second embodiment, the splitting machine 52A and the cutting section 13 are preferably configured to satisfy the above-described conditions (1) and (2). That is, the maximum radius d4 of the spacer member 18g, the number of the protrusion portions 18h, the wrap angle of the fiber bundle, the rotation speed of the spacer member 18g, the cutting interval of the fiber bundle f3 in the longitudinal direction in the cutting section 13, and the like in the splitting machine 52A are preferably adjusted so as to satisfy the conditions (1) and (2).

(Production Method)

A method for producing the molding material using the production apparatus of the second embodiment has the following steps.

Application step: A paste P is applied onto a first sheet S1 that is transported in a predetermined direction.

Spreading step: A fiber bundle f1 is spread in the width direction with the spreading section 50.

Splitting step: A spread fiber bundle f2 is split at intervals in the longitudinal direction with the rotary blades 18f in the splitting machine 52A.

Cutting step: A split fiber bundle f3 is cut at intervals in the longitudinal direction with the cutting section 13.

Sprinkling step: Cut fiber bundles f4 are sprinkled over the paste P that has been applied in the application step.

Impregnation step: The second sheet S2 to which the paste P is applied is overlaid on the first sheet S1 sprinkled with the cut fiber bundles f4, and the paste P and the cut fiber bundles f4 sandwiched between the first sheet S1 and the second sheet S2 are pressurized, thereby allowing the resin to penetrate between the filaments of the cut fiber bundle f4.

The steps other than the splitting step can be carried out in the same manner as in the first embodiment.

In the spreading step, the fiber bundle f1 is pulled out from a bobbin B1 and spread with the spreading section 50, and the spread fiber bundle f2 is split at intervals in the longitudinal direction in the splitting step. In addition, in the cutting section 13, the split fiber bundle f3 is cut with the cutting machine 13A, and the cut fiber bundles f4 are sprinkled over the paste P which has been applied to the first sheet S1.

Also in the present embodiment, similar to the first embodiment, the splitting step and the cutting step preferably satisfy 0.02≤V/W≤0.5 and are preferably carried out so as to satisfy the above-described conditions (1) and (2). Specifically, it is preferable to carry out the splitting step and the cutting step after the maximum radius d4 of the spacer member 18g, the number of the protrusion portions 18h, the wrap angle of the fiber bundle, the rotation speed of the spacer member 18g, the cutting interval of the fiber bundle f3 in the longitudinal direction in the cutting section 13, and the like in the splitting machine 52A are adjusted so as to satisfy the conditions (1) and (2). Therefore, it is possible to shorten the non-split portions and lengthen the split portions in the split fiber bundle while suppressing the occurrence of the twisting or breaking of the fiber bundle. Therefore, the fiber bundle is sufficiently separated, and an SMC having excellent physical properties can be stably produced.

As described above, in the second embodiment, similar to the first embodiment, it is possible to shorten the non-split portions and lengthen the split portions in the split fiber bundle while suppressing the occurrence of the twisting or breaking of the fiber bundle, and thus it is possible to stably produce an SMC having excellent physical properties.

In the present invention, the first embodiment is more preferred than the second embodiment in terms of a viewpoint that the blades are easily thrust through the fiber bundle during splitting. In addition, the second embodiment is more preferred than the first embodiment in terms of a viewpoint that the service lives of the blades in the splitting machine are easily extended.

The present invention is not limited to the aspects exemplified in the description of the first embodiment and the second embodiment. For example, the production apparatuses that are used in the present invention may not include the spreading section. That is, a fiber bundle spread with a separate apparatus may be applied to the present invention.

The shape of the rotary blade that is used in the present invention is not limited to the disc shape and can be appropriately modified as long as the effect of the present invention is not impaired.

Hereinafter, the present invention will be specifically described using examples, but the present invention is not limited to the following description.

Example 1

An SMC was produced using a production apparatus 100 provided as an exemplary example in FIG. 1, FIG. 2A, and FIG. 2B.

As a splitting machine 52, a splitting machine comprising four rotary blades 18a was used. As each rotary blade 18a, a rotary blade provided with one cut-off portion 18d forming a releasing section was used, and the rotary blades were attached such that the heights of the respective cut-off portions 18d all coincided. The radius d1 of a spacer member 18b was set to 14 mm, the shortest radius d2 in the cut-off portion 18d of the rotary blade 18a was set to 14 mm. and the radius d3 of a portion 18e other than the cut-off portion 18d of the rotary blade 18a was set to 17 mm. The cut-off angle α of the cut-off portion 18d that was formed in the rotary blade 18a was set to 180°. x/y was 4. In the rotary blade 18a, the width of a portion that came into contact with a fiber bundle was set to 0.3 mm, and, in the spacer member 18b, the width of a portion that came into contact with the fiber bundle was set to 2.5 mm. The wrap angle θ of the fiber bundle around the spacer member 18b was set to 155°.

As the fiber bundle, a carbon fiber bundle (manufactured by Mitsubishi Chemical Corporation. trade name: TR50S15L, the number of fibers: 15.000 fibers) was used. As a resin that was used in a paste P, a vinyl ester resin was used.

In spreading bars 17, a fiber bundle f1 was broadened to a width of 15 mm. The transportation speed W of a fiber bundle f2 at the time of splitting was set to 40 m/min, and the circumferential speed V of the spacer member was set to 3 m/min. V/W was 0.08. In the spread fiber bundle f2, four rows of split treatment lines d were formed by splitting with the four rotary blades 18a at intervals of 3 mm in the width direction of the fiber bundle f2 so as to form 700 mm-long split portions and 5 mm-long non-split portions. A split fiber bundle f3 was cut with a cutting machine 13A at intervals (L) of 25.4 mm in the longitudinal direction. a/L was 28, and b/L was 0.2. Cut fiber bundles f4 were sprinkled over the paste P that had been applied onto the first sheet S1 without wrapping around a roll or the like. The quality of the SMC thus produced was almost the same as that of an SMC using a chopped carbon fiber bundle of the same size obtained from a carbon fiber bundle comprising a smaller number of filaments (the number of filaments: 3,000) without a splitting step.

Example 2

An SMC was produced using the same production apparatus as in Example 1 except that the rotary blade 18a had x/y set to 5.1.

In spreading bars 17, a fiber bundle f1 was broadened to a width of 15 mm. The transportation speed W of a fiber bundle f2 at the time of splitting was set to 40 m/min. and the circumferential speed V of the spacer member was set to 4 m/min. V/W was 0.1. With splitting using the four rotary blades 18a, the length of a split portion a was set to 2100 mm, which was three times the length of the split portion in Example 1, and the length of a non-split portion b was set to 2 mm. A split fiber bundle f3 was cut with a cutting machine 13A at intervals (L) of 25.4 mm in the longitudinal direction. a/L was 83, and b/L was 0.08. Cut fiber bundles f4 were sprinkled over the paste P that had been applied onto the first sheet S1 without wrapping around a roll or the like. The quality of thus produced SMC was almost the same as that of an SMC using a chopped carbon fiber bundle of the same size obtained from a carbon fiber bundle comprising a smaller number of filaments (the number of filaments: 3.000) without a splitting step.

Example 3

An SMC was produced using the same production apparatus as in Example 1 except that the spreading bars 17 were not used, the cut-off angle α of the cut-off portion of the rotary blade 18a was set to 150°, and x/y was set to 6.7.

The transportation speed W of a fiber bundle f2 at the time of splitting was set to 40 m/min, and the circumferential speed V of the spacer member was set to 1 m/min. V/W was 0.03. With splitting using the four rotary blades 18a, the length of a split portion a was set to 2100 mm, which was three times the length of the split portion in Example 1, and the length of a non-split portion b was set to 5 mm. A split fiber bundle f3 was cut with a cutting machine 13A at intervals (L) of 25.4 mm in the longitudinal direction. a/L was 83, and b/L was 0.2. Cut fiber bundles f4 were sprinkled over the paste P that had been applied onto the first sheet S1 without wrapping around a roll or the like. The quality of thus produced SMC was almost the same as that of an SMC using a chopped carbon fiber bundle of the same size obtained from a carbon fiber bundle comprising a smaller number of filaments (the number of filaments: 3,000) without a splitting step.

Example 4

An SMC was produced using the same production apparatus as in Example 1 except that the spreading bars 17 were not used, the cut-off angle α of the cut-off portion of the rotary blade 18a was set to 180°, and x/y was set to 7.6.

The transportation speed W of a fiber bundle f2 at the time of splitting was set to 40 m/min, and the circumferential speed V of the spacer member was set to 1 m/min. V/W was 0.03. With splitting using the four rotary blades 18a, the length of a split portion a was set to 700 mm, and the length of a non-split portion b was set to 5 mm. A split fiber bundle f3 was cut with a cutting machine 13A at intervals (L) of 25.4 mm in the longitudinal direction. a/L was 28, and b/L was 0.2. Cut fiber bundles f4 were sprinkled over the paste P that had been applied onto the first sheet S1 without wrapping around a roll or the like. The quality of thus produced SMC was almost the same as that of an SMC using a chopped carbon fiber bundle of the same size obtained from a carbon fiber bundle comprising a smaller number of filaments (the number of filaments: 3,000) without a splitting step.

Example 5

An SMC was produced using the same production apparatus as in Example 1 except that, as the splitting section, four rotary blades 18f and five spacer members 18g were provided. The radius d5 of the rotary blade 18f was set to 17 mm, the maximum radius d4 of a part (protrusion portion 18h) of the spacer member 18g was set to 17 mm, and d4−d5 was set to 0 mm. The spacer members 18g were attached such that the heights of the parts (protrusion portions 18h) all coincided.

In the rotary blade 18f, the width of a portion that came into contact with a fiber bundle was set to 0.3 mm, and, in the spacer member 18g, the width of a portion that came into contact with the fiber bundle was set to 2.5 mm. The wrap angle β of the fiber bundle around the spacer member 18g was set to 155°.

As the fiber bundle, a carbon fiber bundle (manufactured by Mitsubishi Chemical Corporation, trade name: TR50S15L, the number of fibers: 15,000 fibers) was used. As a resin that was used in a paste P, a vinyl ester resin was used.

In spreading bars 17, a fiber bundle f1 was broadened to a width of 15 mm. The transportation speed W of a fiber bundle f2 at the time of splitting was set to 40 m/min. The circumferential speed V of the spacer member 18g was set to 3 m/min. V/W was 0.08. With splitting using the four rotary blades 18f, the length of a split portion a was set to 700 mm, and the length of a non-split portion b was set to 2 mm. A split fiber bundle f3 was cut with a cutting machine 13A at intervals (L) of 25.4 mm in the longitudinal direction. a/L was 28, and b/L was 0.08. Cut fiber bundles f4 were sprinkled over the paste P that had been applied onto the first sheet S1 without wrapping around a roll or the like. The quality of the produced SMC was almost the same as that of an SMC using a chopped carbon fiber bundle of the same size obtained from a carbon fiber bundle comprising a smaller number of filaments (the number of filaments: 3,000) without a splitting step.

Example 6

An SMC was produced using, as the splitting section, the same production apparatus as in Example 5 without using the spreading bars 17.

The transportation speed W of a fiber bundle f2 at the time of splitting was set to 40 m/min. The circumferential speed V of the spacer member 18g was set to 1 m/min. V/W was 0.03. With splitting using the four rotary blades 18f, the length of a split portion a was set to 2100 mm, which was three times the length of the split portion in Example 5, and the length of a non-split portion b was set to 1 mm. A split fiber bundle f3 was cut with a cutting machine 13A at intervals (L) of 25.4 mm in the longitudinal direction. a/L was 83, and b/L was 0.2. Cut fiber bundles f4 were sprinkled over the paste P that had been applied onto the first sheet S1 without wrapping around a roll or the like. The quality of thus produced SMC was almost the same as that of an SMC using a chopped carbon fiber bundle of the same size obtained from a carbon fiber bundle comprising a smaller number of filaments (the number of filaments: 3,000) without a splitting step.

Comparative Example 1

An attempt was made to produce an SMC in the same manner as in Example 1 except that the rotary blades were not rotated and were used as fixed blades in the splitting machine, and the fixed blades were kept to thrust through the fiber bundle at all times. As a result, the split fiber bundle partially broke and wrapped around the roll or the like, and it was not possible to produce an SMC.

Comparative Example 2

An attempt was made to produce an SMC in the same manner as in Example 5 except that the rotary blades were not rotated and were used as fixed blades in the splitting machine, and the fixed blades were kept to thrust through the fiber bundle at all times. As a result, the split fiber bundle partially broke and wrapped around the roll or the like, and it was not possible to produce an SMC.

Comparative Example 3

An attempt was made to produce an SMC in the same manner as in Example 5 except that the radius d5 of the rotary blade was set to 17 mm, the maximum radius d4 of the part of the spacer member was set to 16 mm, and d4−d5 was set to −1 mm, whereby the releasing section was not introduced in the rotary blade. As a result, the split fiber bundle partially broke and wrapped around the roll or the like, and it was not possible to produce an SMC.

Reference Signs List

10 Fiber bundle supply section
13 Cutting section
13A Cutting machine
18a, 18f Rotary blade
18b, 18g Spacer member
18c Rotary shaft
18d Cut-off portion
18e Portion other than cut-off portion
18h Protrusion portion
100 Apparatus for producing fiber-reinforced resin molding material
f1 to f4 Fiber bundle
P Paste
S1 First sheet
S2 Second sheet
S3 Stuck sheet
R Sheet

What is claimed is:

1. A splitting machine for splitting a fiber bundle at intervals in a longitudinal direction thereof, the splitting machine comprising a rotary blade for intermittently thrusting through the fiber bundle and a spacer member which is arranged adjacent to and rotates together with the rotary blade, wherein:
a cut-off portion is formed in the rotary blade to serve as a releasing section which is not allowed to thrust through the fiber bundle, such that the rotary blade has an outer circumference of a cut-off circle shape;
a length x (mm) and a length y (mm) satisfy x>2y, where the length x is a length of the outer circumference of a portion of the rotary blade other than the cut-off portion, and the length y (mm) is a length obtained by subtracting the length x from a length (mm) of an entire circumference of the rotary blade assumed to be in a state of not having the cut-off portion; and
the cut-off portion has a cut-off angle α (°) and the cut-off angle α satisfies 180≤α≤200.

2. The splitting machine according to claim 1, wherein the number of the cut-off portion formed in the rotary blade is one.

3. The splitting machine according to claim 1, wherein the cut-off angle α (°) is 180.

4. The splitting machine according to claim 2, wherein the cut-off angle α (°) is 180.

5. The splitting machine according to claim 1, wherein the spacer member has a cylindrical circumference, and a radius d3 and a radius d1 satisfy d3>d1, where the radius d3 is a radius of the portion of the rotary blade other than the cut-off portion, and the radius d1 is a radius of the spacer member.

6. The splitting machine according to claim 5, wherein the radius d1 (mm) of the spacer member and a shortest radius d2 (mm) in the cut-off portion of the rotary blade satisfy −0.5≤d1−d2≤3.

7. The splitting machine according to claim 2, wherein the spacer member has a cylindrical circumference, and a radius d3 and a radius d1 satisfy d3>d1, where the radius d3 is a radius of the portion of the rotary blade other than the cut-off portion, and the radius d1 is a radius of the spacer member.

8. The splitting machine according to claim 7, wherein the radius d1 (mm) of the spacer member and a shortest radius d2 (mm) in the cut-off portion of the rotary blade satisfy −0.5≤d1−d2≤3.

9. The splitting machine according to claim 3, wherein the spacer member has a cylindrical circumference, and a radius d3 and a radius d1 satisfy d3>d1, where the radius d3 is a radius of the portion of the rotary blade other than the cut-off portion, and the radius d1 is a radius of the spacer member.

10. The splitting machine according to claim 9, wherein the radius d1 (mm) of the spacer member and a shortest radius d2 (mm) in the cut-off portion of the rotary blade satisfy −0.5≤d1−d2≤3.

11. A method of preparing a split fiber bundle, comprising splitting a fiber bundle at intervals in a longitudinal direction thereof with the splitting machine according to claim 1.

12. The method of preparing a split fiber bundle according to claim 11, wherein the fiber bundle is a carbon fiber bundle.

13. A method of preparing a split fiber bundle, comprising splitting a fiber bundle at intervals in a longitudinal direction thereof with the splitting machine according to claim 2.

14. The method of preparing a split fiber bundle according to claim 13, wherein the fiber bundle is a carbon fiber bundle.

15. A method of preparing a split fiber bundle, comprising splitting a fiber bundle at intervals in a longitudinal direction thereof with splitting machine according to claim 3.

16. The method of preparing a split fiber bundle according to claim 15, wherein the fiber bundle is a carbon fiber bundle.

17. A method of producing a fiber-reinforced resin molding material, comprising preparing a split fiber bundle by the method according to claim 11, cutting the split fiber bundle to obtain a cut fiber bundle, and impregnating the cut fiber bundle with a resin.

18. The method of producing a fiber-reinforced resin molding material according to claim 17, wherein the resin comprises a thermosetting resin.

\* \* \* \* \*